United States Patent [19]

Nakamura et al.

[11] 4,433,032
[45] Feb. 21, 1984

[54] HIGH CHROME WORK ROLL

[75] Inventors: Shiro Nakamura, Ashiya; Yoshihiro Nakagawa, Nishinomiya; Takashi Hashimoto, Sakai, all of Japan

[73] Assignee: Kubota Ltd., Osaka, Japan

[21] Appl. No.: 256,568

[22] Filed: Apr. 22, 1981

[30] Foreign Application Priority Data

Oct. 26, 1979 [JP] Japan ................. 54-138461

[51] Int. Cl.³ ............................. B32B 15/18
[52] U.S. Cl. .................... 428/682; 148/35; 75/123 CB; 29/130; 29/132
[58] Field of Search ............ 29/130, 132; 75/123 CB; 148/35; 428/681–685, 614

[56] References Cited

U.S. PATENT DOCUMENTS 2,771,358  11/1956  Spear ........................ 148/35

FOREIGN PATENT DOCUMENTS 44-12264  3/1969  Japan ........................ 148/35
52-56012  5/1977  Japan ........................ 29/130
55-158250 12/1980  Japan ........................ 29/130

Primary Examiner—Michael L. Lewis
Attorney, Agent, or Firm—Armstrong, Nikaido, Marmelstein & Kubovcik

[57]  ABSTRACT

In a high chrome work roll, between the outer layer of a cast iron containing 10~25 weight % Cr and the core of a ductile cast iron containing less than 1.5 weight % Cr, an intermediary layer of a cast iron containing 5~10 weight % Cr is provided, and united therewith integrally in the metallurgical sense.

This high chrome work roll is manufactured by forming the outer layer by casting the molten metal into a revolving mold of a centrifugal caster; forming the intermediary layer by casing into this mold the molten metal to form a cast iron containing less than 1.0% Cr, before the inside surface of the outer layer has been set, and finally forming the core by casting the molten metal to form a ductile cast iron into this mold, the existence of the intermediary layer preventing as much as possible Cr from diffusing and mixing into the core.

6 Claims, 2 Drawing Figures

HIGH CHROME WORK ROLL

BACKGROUND OF THE INVENTION

The present invention relates to a high chrome work roll manufactured by centrifugal casting, and particularly pertains to a high chrome work roll having high resistances, to wear and surface roughening and fail-safe properties as finishing work rolls including those for hot strip mills, cold strip mills and for hot skin pass, and a manufacturing method of the said roll.

As is heretofore known, for finishing work rolls employed for hot or cold rolling, etc., following characteristics are required:

(1) Wear resistance:

This is an important property having bearing on the surface property and the sheet thickness accuracy of the rolled product.

(2) Fail-safe property:

The work roll needs to have adequate toughness to abnormal rolling.

(3) Resistance to surface roughening:

Since the property of the roll surface has a large bearing on the quality of the rolled product, resistance to surface roughening is necessary.

As materials having the above listed three characteristics, Adamite, indefinitely chilled material, ductile material, chilled material, cast steel or forged and quenched steel, etc., are taken seriously and are finding wide uses, but having respective merits and demerits, they still can not be said adequate as finishing work rolls of strip mills, etc.

Thus Adamite and indefinitely chilled material, for example, in which free cementite is crystallized out in large quantities, are problematical in their resistance to the surface roughening and in their toughness. In steel in which graphite is crystallized out, such graphite falls off, resulting in surface roughening. As a remedy, uniform dispersion of hard carbides into the material is effective. For this purpose, it is advisable to have the roll made of a material in which the resistance to surface roughening and wear resistance are improved by increasing the Cr content. However, to achieve high hardness with the same material is to have high internal residual stress, causing difficulty in manufacture. So, as is well known, a composite roll formed of different materials for its barrel part and for its journal part (internal layer) is employed. Such a composite roll is generally formed by way of centrifugal casting.

When in the above-mentioned composite roll, a material having a large Cr content is used for its shell, and a steel material is used for the core, the toughness of the material will not be substantially deteriorated, even if a core with a high Cr content results from the diffusion of Cr from the inside surface of the shell into the core. However, in manufacturing the core of steel, the feeder for preventing shrinkage holes in the cope part needs to be increased, resulting in high cost, and because of high modulus of elasticity, such a material is disadvantageous in regard to the thermal stress and residual stress.

Accordingly, in order to reduce feeder, and decrease the modulus of elasticity of the core, thereby relieving the thermal stress and the residual stress, the core should desirably be formed of a cast iron, but if Cr in the shell is remelted, and diffused into the core, the core material becomes very brittle, causing the significance of the compounding to be lost. Moreover, when a high Cr material is used for the shell, an oxide film with a high melting point is formed on the inside surface of the shell, giving rise to inadequate weldability.

SUMMARY OF THE INVENTION

The present invention has as its object providing a high chrome work roll which is quite excellent in resistance to wear and surface roughening and in fail-safe properties by eliminating the drawbacks and problems in the finishing work rolls for hot rolling and cold rolling.

It is an object of this invention to provide a high chrome work roll in which between the outer layer of a cast iron consisting of 2.0~3.2% C, 0.5~1.5% Si, 0.5~1.5% Mn, less than 0.08% P, less than 0.06% S, 1.0~2.0% Ni, 10~25% Cr, 0.5~1.5% Mo, less than 1.0% Nb and less than 1.0% V, balance substantially Fe, and the core made of 3.0~3.8% C, 2.3~3.0% Si, 0.3~1.0% Mn, less than 0.1% P, less than 0.02% S, less than 2.0% Ni, less than 1.5% Cr, less than 1.0% Mo and 0.02~0.1% Mg, balance substantially Fe, an intermediary layer formed of a cast iron containing 1.0~2.5% C, 0.5~1.5% Si, 0.5~1.5% Mn, less than 1.5% Ni, 5~10% Cr and less than 1.0% Mo, balance substantially Fe, is placed, and bonded integrally thereto in the metallurgical sense.

It is a further object of this invention to provide a method for manufacturing a high Cr work roll having a process for forming an intermediary layer by filling a low Cr molten metal thereinto between the casting process for the outer layer and that for the core, thereby preventing Cr from diffusing, and mixing, into the core from the outer layer containing high Cr content.

DETAILED DESCRIPTION OF THE INVENTION

Figure 1:
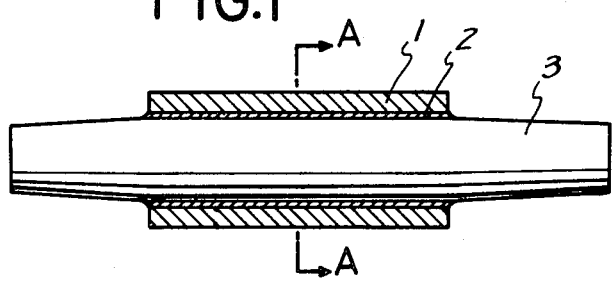
FIG. 1 denotes a front view of a work roll of this invention being cut by a plane containing its central axis.

The outer layer of the high chrome work roll of this invention is described follows: This outside layer has a hardness at 70~80 Hs(Shore hardness). Its components and their proportions are described hereunder:

C is determined by the amount of carbide intended to have, and by striking the balance with Cr within the range where stable carbides of the $(Fe, Cr)_7C_3$ type may be obtained. If the C content is smaller than 2.0, the amount of carbides formed is small, resulting in reduced wear resistance, but if it is in excess of 3.2%, the amount of carbides becomes too large, causing degradation in mechanical strength. Accordingly, the C content should be 2.0~3.2%.

Si is used for deoxidation of molten metal. With less than 0.5%, this effect can not be achieved. If it is contained in excess of 1.5%, degradation in mechanical properties will result, or the temperature of modification from $\alpha$ to $\gamma$ iron is raised, causing difficulty in the conversion to $\gamma$ iron, and consequently, making it difficult to attain high hardness. For this reason, the Si content should run within the range of 0.5~1.5%.

The amount of Mn as an aid in the deoxidation by Si must be at least 0.5%. If it is lower than 0.5%, the effect of deoxidation is not evident, but if it is contained higher than 1.5%, lowering in the mechanical properties, especially in toughness, becomes marked. Accordingly, the Mn content should be 0.5~1.5%.

As for P, the smaller P content the roll material in particular has, the more desirable, and in view of its effect of embrittling the material, its content should be less than 0.08%.

As for S, the smaller content is desirable, because like P it has the effect of embrittling the roll material. Its content should preferably be less than 0.06%.

Ni is contained for positive adjustment of hardness or to improve the quenching property. With its content less than 1.0%, no effect is obtained, but if it is contained more than 2%, the residual austenite increases, making it difficult to raise the hardness. Especially to attain the hardness range of 70~80 Hs, the Ni content should fall within the range of 1.0~2.0%.

Cr is for improving the toughness and wear resistance. If its content is lower than 10%, large amount of carbides of the $M_3C$ type will be crystallized out. As a result, the toughness declines, and refinement and uniformization can not be achieved. If it is contained over 25%, the amount of carbides of the $M_{23}C_6$ type increases. These carbides, having low hardness as compared with $M_7C_3$ carbides, do not give adequate wear resistance. Accordingly, Cr content should be 10~25%.

Mo is effective not only for enhancing the resistance to quenching and tempering but for promoting the resistance to softening by tempering, while increasing the hardness of the carbides by entering into them. This effect cannot be achieved with its content less than 0.5%, but its content in excess of 1.5% will result in too high a hardness being higher than 80 HS. Accordingly, the Mo content should be 0.5~1.5%.

Nb, being effective for refining the casting structure, is a desirable component to be added, but the roll of this invention may be produced without its addition. The Nb content promotes precipitation hardening, thereby making improvement in the wear resistance. Especially in the hardness range of 70~80 Hs, this effect is apparent at under 0.1% Nb contents. If its content is higher than 1.0%, this effect will reach saturation, and high cost also results. Accordingly, the Nb content should be lower than 1.0%.

V is contained for the similar purpose as Nb. Its addition is desirable, but without its addition, the roll of this invention may be realized. To have a hardness range of 70~80 Hs, the V content of less than 1.0% is sufficient. If its content is higher than 1.0%, the amount of V carbides increases, thus proportionally decreasing the amount of Cr carbides, resulting conversely in reduced wear resistance. Accordingly, the V content should be less than 1.0%.

The above descriptions on respective components are taken in connection with the hardness range of 70~80 Hs. Such limitations may be defined by the following reasons: Generally, the wear resistance of the finishing work roll in the hot and cold rolling operations is intimately interrelated with hardness. Thus, at hardnesses below 70 Hs, the resistance to surface roughening and wear resistance abruptly decline, while the fail-safe property and the anti-cracking property tend to fall rapidly, as the hardness runs higher beyond 80 Hs as a border line due to the local heating of the roll in abnormal rolling conditions. Accordingly, in order to ensure high resistance to the surface roughening, wear resistance, fail-safe property and the anti-cracking property, the hardness range of 70~80 Hs is preferable for high chrome work rolls.

In the following, the components and their proportions in the core material of the high chrome work roll of this invention are described:

The mixing-in of Cr from the outside layer into the core material is very much reduced by providing the intermediary layer, as compared with the roll having no intermediary layer, but it is impossible to completely prevent the mixing-in of Cr. Due to the diffusion of Cr from the outer layer, the Cr content of the core material rises by approximately 0.5~1.0%. The chemical compositions and their proportions of the core material need to be chosen with this increase of Cr content taken into calculation.

C is contained for imparting toughness and strength. With the C content less than 3.0%, the chilling of the material proceeds, causing notable reduction in the toughness of the core. If it is contained more than 3.8%, graphitization becomes excessive. Then not only will the strength of the core become insufficient, but the journal part tends to have lowered hardness, and become susceptible to surface roughening while in service. Accordingly, the C content should be 3.0~3.8%.

If Si content runs lower than 2.3%, graphitization does not proceed well; cementite heavily precipitates out, and if it is contained in excess of 3.0%, the graphitization is promoted, thus inviting reduced strength. Accordingly, the Si content should be 2.3~3.0%.

Mn eliminates the harmful effects of S by bonding with S to form MnS. Its contents less than 0.3% show no effect. On the other hand, over 1.0% contents give deterioration of the material rather than preventing the harmful effects of S. Accordingly, the Mn content should be 0.3~1.0%.

P, being effective for increasing the fluidity of the molten metal, but making the material brittle, should desirably be contained in smaller amounts. The P content should be lower than 0.1%.

Since S like P embrittles the material, the smaller content the material has, the better. The core material, being of a ductile cast iron, combines with Mg to form MgS, thereby reducing S. For the graphite to be globular, however, the S content needs to be small. Accordingly, the S content should be less than 0.02%.

Ni is contained for stabilizing graphite. Its contents in excess of 2.0% show no prominent effect. The Ni content should be less than 2.0%.

Because the outside layer has a high chrome content, some mixing-in of Cr into the core material is unavoidable, even if the intermediary layer is provided. The lower the Cr content the material has, the more desirable, but where the precipitation of graphite is concerned, to strike its balance with Si, its content should preferably be lower than 1.5%. Its contents, if higher than 1.5%, will cause increase of cementite in the material and thus reduction in toughness. Accordingly, the Cr content should be lower than 1.5%.

Mo is a desirable element, because it obstructs the crystallization graphite. But too high a content of this element results in too high a hardness. Accordingly, the Mo content should be less than 1.0%.

Mg is an element necessary for globular formation of graphite. But if its content is less than 0.02%, the globular formation becomes improper; as a result, the core material can not be made tough and ductile. Its content over 0.1% is undesirable because of its chilling effect, and because it is trapped into the product as dross. Accordingly, the Mg content should be 0.02~0.1%.

Cr, Ni and Mo contained in the core material is usually mixed in the material inevitably when they are not positively added. This invention is realizable without addition of these components.

In the following, the components and their proportions of the intermediary layer of the high chrome work roll of this invention are described.

This intermediary layer is provided for preventing the high chrome content in the outside layer from diffusing into the core material, thereby reducing the toughness of the core material with Cr.

C is contained for the purpose of imparting the toughness and strength to the intermediary layer. If Cr in the outside layer is dissolved by the intermediary molten metal, and it is completely mixed uniformly with the intermediary molten metal, Cr will amount to 5~10% in total. If the C content is lower than 1.0%, the casting temperature of the intermediary layer will run high. Then the outside layer tends to melt, causing the Cr % to rise further. As a consequence, the significance of the intermediary layer as a means for preventing the diffusion of Cr into the core material will be lost.

If the C content runs higher than 2.5%, the amount of carbides increases; then the intermediary layer itself loses toughness, thus leading to deprivation of its significance. Accordingly, the C content should be 1.0~2.5%.

For casting the intermediary layer, the smaller the Cr content it has, the more desirable. For the chemical composition in the ladle before the molten metal is cast to have the intermediary layer, it should be lower than 1.0%, which proportion is readily controllable in the industrial practice. The sum total of the amount of Cr in the molten metal in the ladle before being cast and the amount of Cr coming from the outside layer when forming the intermediary layer by casting runs as high as 5~10%. This Cr will enter the core material, leading to the rise in the content of Cr in the core material.

In order to control the amount of Cr in the core material below 1.5%, the amount of Cr in the intermediary layer needs to be regulated to within the range of 5~10% by choosing proper casting condition. Accordingly, the Cr content should be 5~10%.

Si has the effect of deoxidizing the molten metal. Its contents lower than 0.5% have no such effect. At least 0.5% is required. But if its content exceeds 1.5%, the intermediary layer becomes brittle, resulting in deterioration in its mechanical properties. The Si content should be 0.5~1.5%.

Mn has the similar effect as that of Si, and moreover, it removes the harmful effects of S by forming MnS therewith. Its content of 0.5% is necessary. If it is contained in excess of 1.5%, its effect is saturated, and deterioration in its mechanical properties will occur. Accordingly, the Mn content should be 0.5~1.5%.

Ni is contained for imparting proper quenching property and improved toughness. Its content will go up above 0.3% through its mixing-in from the shell without its positive addition. Its contents up to 1.5% provide this effect without involving any problems. If its content exceeds 1.5%, the quenching is promoted to make the matrix too hard, an undesirable result from the aspect of toughness and residual stress.

Mo has the similar action as that of Ni. Its contents over 1.0% make the intermediary layer too hard. Its content should be lower than 1.0%.

Comments on P, S and Ti follow: P elevates the fluidity of the molten metal; but causes reduction in the toughness in the roll material. The P content should be lower than 0.1%.

S like P embrittles the roll material. Its actually harmless content should be lower than 0.1%.

Ni and Mo in the intermediary layer are elements desired to be added, but this invention may be enforced without their addition.

The addition of Ti is desirable for deoxidation of the molten metal. If its content is lower than 0.01%, it has no deoxidation effect. Its contents in excess of 0.1% make the molten metal into peroxidized state, and cause reduction in the fluidity of the molten metal. Accordingly, the Ti content should be 0.01~0.1%. Al and Zr which are normally employed as deoxidizing agents in place of Ti may be used in the range of 0.01~0.1%. Ti, Al and Zr achieve optimal results in the range of 0.03~0.05%.

Figure 2:
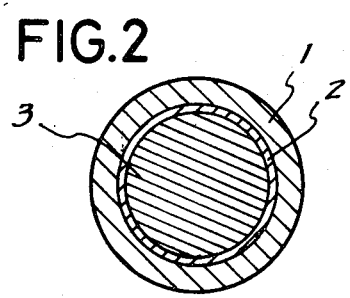
FIG. 2 gives a sectional view of the work roll of FIG. 1 taken along the line A—A.

The high chrome work roll of this invention has the construction above described in detail. The manufacturing method of this high chrome work roll is described in connection with an embodiment shown in FIGS. 1 and 2.

First after the molten metal to form the outer layer 1 is cast into the metal mold lined with a refractory on its inner surface which is revolved on a centrifugal casting machine, the intermediary layer 2 is cast thereinto, before the inside surface of the outer layer 1 is coagulated. Then after these two parts, that is, the outer layer 1 and the intermediary layer 2, are completely set, the mold is stood erect, and through its top, the molten metal to form the ductile cast iron of the core 3 is cast thereinto, whereby the outer layer 1, the intermediary layer 2 and the core 3 are completely combined in the metallurgical sense into an integral roll.

As an alternative, before the outer layer 1 and the intermediary layer 2 both have not completely been set, the core 3 may be cast by a suitable method with the use of a centrifugal caster provided with the axis of rotation of the mold being held horizontal or inclined, while part of the inside surface remains in the uncoagulated state.

An embodiment of the high chrome work roll of this invention is described hereunder:

EMBODIMENT

Three kinds of high chrome work roll with the barrel diameter 680 mm, the barrel length 1,800 mm and the total length 3,800 mm was manufactured using alloy of Examples 1, 2 and 3 as listed in the following table.

(1) A high chromium molten metal to form the 80 mm thickness (2,400 kg) of the outer layer was cast into a rotating mold on a centrifugal casting machine at 1,400° C.

(2) Eighteen minutes after beginning the casting of the outer layer, a molten metal to form the thickness of 35 mm (1,000 kg) of the intermediary layer was cast into the revolving mold at 1,470° C.

(3) Thirty three minutes after beginning the casting of the outer layer, the outer layer and the intermediary layer were completely coagulated.

(4) Thereafter, the mold is stood erect, and through its top, the molten metal to form the ductile cast iron of the core was cast thereinto at 1,380° C., and then, after the mold had been completely filled, the cast iron was provided with the riser, and covered with an insulator.

(5) After being completely cooled, the roll was taken out of the mold, was subjected to a machining, yielding the final product roll.

The results of an ultrasonic test and a fracture examination on the roll barrel showed that the thickness of the outer layer became 60 mm, after the intermediary layer was cast, that the intermediary layer had a thickness of 30~35 mm, and that its Cr content was 6.0~8.0%.

The outer layer, the intermediary layer and the core were found completely united, and with evidence of structural continuity.

The chemical compositions of examples 1, 2 and 3 of the molten metals before being cast for the outer layer, the intermediary layer and for the core are as listed in the table below:

By the way small amount of Nb and V enters to the intermediary layer from outer layer at the stage of casting.

|  |  |  | C | Si | Mn | P | S | Ni | Cr | Mo | Nb | V | Ti | Mg |
|---|---|---|---|---|---|---|---|---|---|---|---|---|---|---|
| example 1 | before casting | Outer layer | 2.75 | 0.69 | 1.10 | 0.032 | 0.020 | 1.55 | 14.20 | 1.30 | — | — | — | — |
|  |  | Intermediary layer | 1.63 | 0.68 | 0.98 | 0.030 | 0.021 | 0.43 | 0.09 | 0.06 | — | — | 0.042 | — |
|  |  | Core | 3.49 | 2.63 | 0.35 | 0.033 | 0.009 | 0.44 | 0.12 | 0.05 | — | — | — | 0.072 |
|  | produced roll | Outer layer | 2.75 | 0.69 | 1.10 | 0.032 | 0.020 | 1.55 | 14.20 | 1.30 | — | — | — | — |
|  |  | Intermediary layer | 1.90 | 0.68 | 1.01 | 0.031 | 0.021 | 0.76 | 5.32 | 0.30 | — | — | 0.030 | — |
|  |  | Core | 3.42 | 2.61 | 0.39 | 0.033 | 0.010 | 0.57 | 0.87 | 0.06 | — | — | — | 0.069 |
| example 2 | before casting | Outer layer | 2.81 | 0.75 | 0.89 | 0.040 | 0.030 | 1.25 | 18.62 | 0.86 | 0.35 | 0.20 | — | — |
|  |  | Intermediary layer | 1.75 | 0.76 | 0.92 | 0.027 | 0.030 | 0.52 | 0.12 | 0.30 | — | — | 0.07 | — |
|  |  | Core | 3.42 | 2.85 | 0.65 | 0.065 | 0.010 | 0.65 | 0.29 | 0.15 | — | — | — | 0.06 |
|  | produced roll | Outer layer | 2.81 | 0.75 | 0.89 | 0.040 | 0.030 | 1.25 | 18.62 | 0.86 | 0.35 | 0.20 | — | — |
|  |  | Intermediary layer | 2.08 | 0.76 | 0.91 | 0.032 | 0.030 | 0.85 | 6.8 | 0.42 | 0.08 | 0.03 | 0.058 | — |
|  |  | Core | 3.35 | 2.68 | 0.72 | 0.060 | 0.010 | 0.67 | 0.95 | 0.17 | — | — | — | 0.058 |
| example 3 | before casting | Outer layer | 2.92 | 0.89 | 0.99 | 0.028 | 0.042 | 1.09 | 19.55 | 0.56 | 0.16 | 0.10 | — | — |
|  |  | Intermediary layer | 2.23 | 0.92 | 0.95 | 0.021 | 0.044 | 0.06 | 0.35 | 0.25 | — | — | 0.066 | — |
|  |  | Core | 3.56 | 2.93 | 0.46 | 0.066 | 0.002 | 0.06 | 0.09 | 0.03 | — | — | — | 0.055 |
|  | produced roll | Outer layer | 2.92 | 0.89 | 0.99 | 0.028 | 0.042 | 1.09 | 19.55 | 0.56 | 0.16 | 0.10 | — | — |
|  |  | Intermediary layer | 2.41 | 0.90 | 0.97 | 0.025 | 0.043 | 0.32 | 7.21 | 0.35 | 0.03 | 0.02 | 0.055 | — |
|  |  | Core | 3.49 | 2.76 | 0.55 | 0.070 | 0.009 | 0.09 | 0.59 | 0.09 | — | — | — | 0.051 |

In the following, an operational result obtained with the high chrome work roll of this invention is illustrated:

A roll having the same chemical analysis listed in the above-described embodiment was employed as the work roll for hot strip mills.

The result revealed an excellent wear resistance in rolling Hi-C materials which are highly resistant to deformation.

| Rolling with conventional rolls, consumption per one cycle: | 0.21 mm |
|---|---|
| Rolling with conventional rolls, mean shaving rate per one cycle in the shaving of the consumed roll surface: | 0.35 mm |
| Rolling with the roll of this invention, consumption per one cycle: | |
| example 1 | 0.16 mm |
| example 2 | 0.14 mm |
| example 3 | 0.15 mm |
| Rolling with the roll of this invention, mean shaving rate per one cycle in the shaving of the consumed roll surface: | |
| example 1 | 0.26 mm |
| example 2 | 0.23 mm |
| example 3 | 0.24 mm |

With regard to surface roughening, any surface roughening has never compelled abnormal roll exchange. The rolling operation was carried out until the roll was reduced to its final diameter (the depth of the surface consumption 40 mm) with no trouble but with successful result.

The high chrome work roll of this invention and its manufacturing method are not limited to the embodiment above-described with reference to the accompanying drawings, and it is no doubt permissible for the man skilled in the art to readily make various alterations without departing from the spirit of this invention as defined hereunder in the scope of claims for the patent.

What is claimed:

1. A high chrome work roll comprising an intermediary layer of a cast iron having, on the weight basis, 1.0–2.5% C, 0.5–1.5% Si, 0.5–1.5% Mn and 5–10% Cr, balance substantially Fe being provided between, and united, integrally in the metallurgical sense, with the outer layer of a cast iron having 2.0–3.2% C, 0.5–1.5% Si, 0.5–1.5% Mn, less than 0.08% P, less than 0.06% S, 1.0–2.0% Ni, 10–25% Cr and 0.5–1.5% Mo, balance substantially Fe, and the core having 3.0–3.8% C, 2.3–3.0% Si, 0.3–1.0% Mn, less than 0.1% P, less than 0.02% S, and 0.02–0.1% Mg, balance substantially Fe, wherein the hardness of the outer layer is 70–80 Hs.

2. A high chrome work roll comprising an intermediary layer of a cast iron having, on the weight basis, 1.0–2.5% C, 0.5–1.5% Si, 0.5–1.5% Mn, less than 1.5% Ni, 5–10% Cr and less than 1.0% Mo, balance substantially Fe being provided between, and united, integrally in the metallurgical sense, with the outer layer of a cast iron having 2.0–3.2% C, 0.5–1.5% Si, 0.5–1.5% Mn, less than 0.08% P, less than 0.06% S, 1.0–2.0% Ni, 10–25% Cr, 0.5–1.5% Mo less than 1.0% Nb and less than 1.0% V, balance substantially Fe, and the core having 3.0–3.8% C, 2.3–3.0% Si, 0.3–1.0% Mn, less than 0.1% P, less than 0.02% S, less than 2.0% Ni, less than 1.5% Cr, less than 1.0% Mo and 0.02–0.1% Mg, balance substantially Fe, wherein the hardness of the outer layer is 70–80 Hs.

3. A high chrome work roll as defined in claim 2 wherein the intermediary layer contains 0.01–0.1% Ti.

4. A high chrome work roll as defined in claim 2 wherein the intermediary layer contains 0.01–0.1% Al.

5. A high chrome work roll as defined in claim 2 wherein the intermediary layer contains 0.1–0.1% Zr.

6. A high chrome work roll as defined in claim 1, wherein the intermediary layer further comprising at least one element in the amount of 0.01–0.1%, on the weight basis, of Ti, Al and Zr.

* * * * *